(12) United States Patent
Hon et al.

(10) Patent No.: US 7,788,819 B2
(45) Date of Patent: Sep. 7, 2010

(54) METHOD OF MEASURING SHAPE OF WORKPIECE BY USING ON-BOARD MEASURING MACHINE FOR CARRYING OUT TEMPERATURE DRIFT CORRECTION AND MACHINE TOOL HAVING ON-BOARD MEASURING MACHINE

(75) Inventors: Yonpyo Hon, Yamanashi (JP); Kenzo Ebihara, Yamanashi (JP); Akira Yamamoto, Yamanashi (JP); Masayuki Hamura, Yamanashi (JP)

(73) Assignee: Fanuc Ltd (JP)

( * ) Notice: Subject to any disclaimer, the term of this patent is extended or adjusted under 35 U.S.C. 154(b) by 0 days.

(21) Appl. No.: 12/505,928

(22) Filed: Jul. 20, 2009

(65) Prior Publication Data

US 2010/0101105 A1 Apr. 29, 2010

(51) Int. Cl.
 *G01B 7/00* (2006.01)
(52) U.S. Cl. .......................................... 33/503; 33/561
(58) Field of Classification Search .................... 33/503, 33/549–551, 556, 558, 558.01, 558.3, 559–561
See application file for complete search history.

(56) References Cited

U.S. PATENT DOCUMENTS

| | | | | |
|---|---|---|---|---|
| 5,107,598 A | * | 4/1992 | Woznow et al. | 33/521 |
| 6,635,020 B2 | * | 10/2003 | Tripp et al. | 600/488 |
| 7,085,628 B2 | * | 8/2006 | Ohmi et al. | 700/299 |
| 7,669,455 B2 | * | 3/2010 | Ohmi et al. | 73/1.62 |
| 7,685,733 B2 | * | 3/2010 | Ohmori et al. | 33/559 |
| 2004/0144178 A1 | * | 7/2004 | Ohmi et al. | 73/708 |
| 2009/0033271 A1 | * | 2/2009 | Hon et al. | 318/640 |
| 2009/0235397 A1 | * | 9/2009 | Hon et al. | 850/46 |
| 2009/0292503 A1 | * | 11/2009 | Hon et al. | 702/168 |
| 2010/0030368 A1 | * | 2/2010 | Hon et al. | 700/195 |
| 2010/0082289 A1 | * | 4/2010 | Staaden | 702/150 |

FOREIGN PATENT DOCUMENTS

| | | |
|---|---|---|
| JP | 2004-286507 A | 10/2004 |
| JP | 2006-138698 A | 6/2006 |

\* cited by examiner

*Primary Examiner*—Yaritza Guadalupe-McCall
(74) *Attorney, Agent, or Firm*—Lowe Hauptman Ham & Berner, LLP (57) ABSTRACT

In a machine tool having an on-board measuring machine and controlled by a numerical controller, a method of measuring a shape of a workpiece presets a reference point for temperature drift correction on the workpiece, moves a probe to the reference point, resets a coordinate system of the probe to correct a temperature drift of the probe, and carries out shape measurement of the workpiece along a first measuring path. Next, the method moves the probe to the reference point again, resets the coordinate system of the probe to correct a temperature drift of the probe again, and carries out shape measurement of the workpiece along a second measuring path. Thereafter, similar temperature drift correction is carried out for each measuring path until the shape measurement of the workpiece is carried out along the last measuring path.

3 Claims, 11 Drawing Sheets

IP:NAME OF AXIS

C0:WORKPIECE COORDINATE SYSTEM TO BE SET

FIG. 13

Oxxxx;

MOVE TO REFERENCE POINT OP;

G92 ZP 0;  RESET PROBE POSITION COORDINATE (ZP) BY G CODE

SHAPE MEASUREMENT ON FIRST MEASURING PATH

MOVE TO REFERENCE POINT OP

G92 ZP 0;

SHAPE MEASUREMENT ON SECOND MEASURING PATH

⋮

THEREAFTER, REPEAT UNTIL THE END OF MEASUREMENT

FIG. 14

METHOD OF MEASURING SHAPE OF WORKPIECE BY USING ON-BOARD MEASURING MACHINE FOR CARRYING OUT TEMPERATURE DRIFT CORRECTION AND MACHINE TOOL HAVING ON-BOARD MEASURING MACHINE

RELATED APPLICATIONS

The present application is based on, and claims priority from, Japanese Application Number 2008-276779, filed Oct. 28, 2008, the disclosure of which is hereby incorporated by reference herein in its entirety.

BACKGROUND OF THE INVENTION

1. Field of the Invention

The present invention relates to a method of carrying out temperature drift correction of a measuring machine (on-board measuring machine) provided on a machine tool and measuring a shape of a workpiece by using the on-board measuring machine and to a machine tool on which the measuring machine for measuring the shape of the workpiece is provided.

2. Description of the Related Art

Figures 1A, 1B:
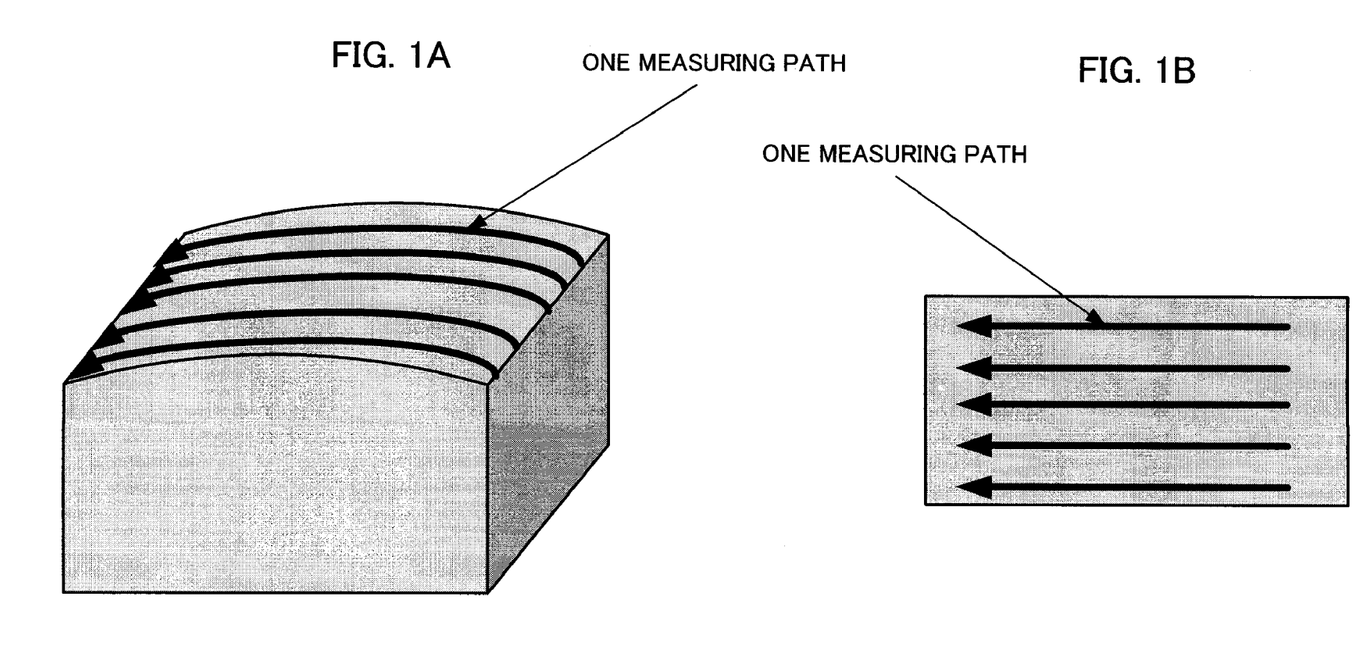
FIGS. 1A and 1B are drawings for explaining measurement of the whole face of a measured surface of a measured object by respectively scanning along a plurality of measuring paths.

As shown in FIGS. 1A and 1B, there is a well-known three-dimensional measuring machine for measuring a shape of a measured surface of a measured object by measuring positions in a height direction (i.e., a vertical direction) including components orthogonal to a scanned surface while scanning the measured surface of the measured object with a probe in a two-dimensional manner.

This three-dimensional measuring machine scans the measured surface of the measured object at relatively low speed of several tens of millimeters/second or lower by using the probe and therefore it takes a relatively long time over ten minutes to measure the whole face of the measured surface of the measured object. The three-dimensional measuring machine itself has 1-nanometer or better measurement resolution of a single axis in each axial direction and measurement performance of the overall three-dimensional measuring machine is secured by controlling temperature in an ambient environment of the measured object so that temperature change is 1° C. or smaller.

However, if the measurement takes 10 minutes or longer, the three-dimensional measuring machine itself may suffer from local deformation because of its mechanism due to thermal expansion of members forming the three-dimensional measuring machine. Therefore, even with sufficient design consideration, errors depending on the temperature change in the measurement environment are superimposed on measurement values obtained as a result of the measurement. The error in the measurement value is mainly caused by thermal expansion or thermal contraction of the members forming the three-dimensional measuring machine and is a slow component with a relatively long period synchronized with a time period of the temperature change. Hereafter, the error in the measurement value will be referred to as a temperature drift.

Figure 2A:
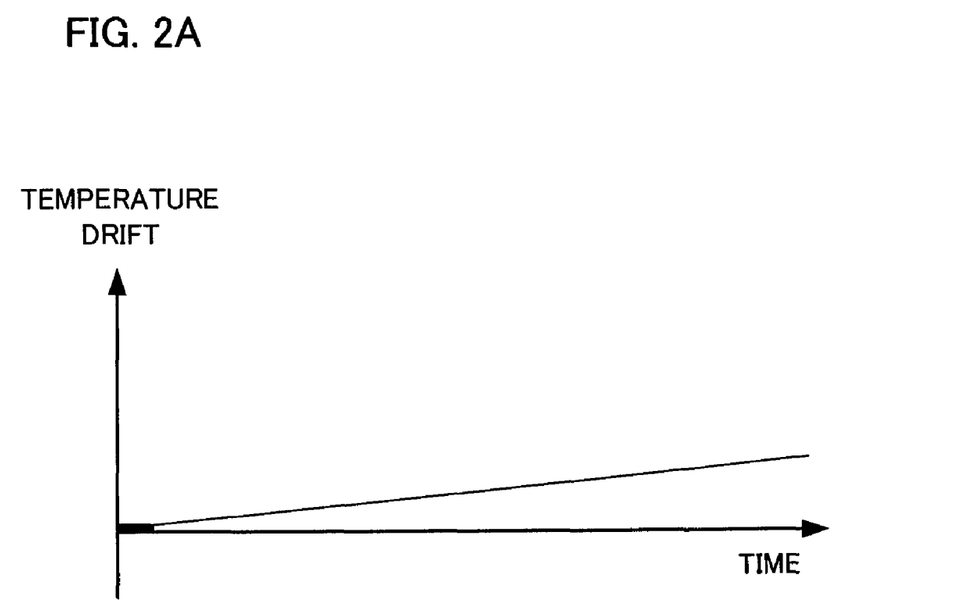
FIG. 2A is a drawing for explaining a relationship between a measurement time and a temperature drift along one measuring path.

According to the nature of the thermal expansion or the thermal contraction of the members forming the three-dimensional measuring machine, it takes the temperature drift due to the change in the ambient temperature more than several hours to become stable in many cases and the temperature drift tends to increase with time as shown in FIG. 2A.

To cope with this, there is an example of the three-dimensional measuring method and machine, as disclosed in Japanese Patent Application Laid-Open (JP-A) No. 2006-138698, which can correct a temperature drift even if the temperature drift occurs in the measuring machine due to deformation of the measuring machine itself during long-time measurement.

According to the technique disclosed in this Patent Document, a probe scans a measured surface along first scanning lines including a plurality of concentric circles about a center point of the measured surface through which an axisymmetry line of an axisymmetric workpiece (e.g., a lens and a semiconductor wafer) passes and second scanning lines including two straight lines (cross lines) passing through the center point, respectively, to obtain coordinate data (here, scanning along the first scanning lines takes a longer time than scanning along the second scanning lines and, as a result, the three-dimensional measuring machine suffers from drifts along coordinate axes direction due to the change in ambient temperature around the machine). Then, coordinate data at intersecting points of the first scanning lines and the second scanning lines are extracted from the coordinate data and drift amounts in the three-dimensional measuring machine are obtained from the extracted coordinate data. Then, by using the drift amounts, the coordinate data including measurement errors are corrected. If there are not coordinate data at the intersecting points of the first scanning lines and the second scanning lines, the intersecting points are calculated by interpolating shape measurement data obtained by scanning along the first scanning lines.

The above-described technique can be applied to only the axisymmetric workpiece, which can be measured along the cross lines, and cannot be applied to the workpiece not in the axisymmetric shape. Moreover, calculation of interpolation for obtaining the coordinate data at the intersecting points of the first scanning lines and the second scanning lines is carried out based on approximation by using four arithmetic operations and the like and therefore nanoscale deviations from actual intersecting points may occur and the deviations directly result in errors caused by the interpolation.

Furthermore, the above-described technique requires special software for operations of comparison processing between the measurement data along the first scanning lines (concentric circles) and the measurement data along the second scanning lines (cross lines), interpolation processing based on approximation, and correction processing of the drift amount. As a result, an operation amount for the correction processing increases in proportion to the measurement data amount and a processing time may become long. Therefore, a cost of the software and a prolonged takt time for one workpiece increase a cost.

In order to achieve nanometer shape accuracy in ultraprecision machining, a machined shape needs to be measured on an ultraprecision machine (i.e., on-board measurement) without detaching a machined workpiece from the ultraprecision working machine and corrective working needs to be carried out based on a measurement result. However, to achieve such correction, the on-board measuring machine needs to have 1-nanometer or better measurement resolution.

In the ultraprecision working machine, a drive portion and a support portion of the machine are generally disposed in an internal space (hereafter referred to as "an inside of the machine") of the ultraprecision working machine isolated from an outside of the machine in order to maintain nanometer positioning accuracy. Temperature of the inside of the machine is constantly controlled with high accuracy by using a temperature adjusting machine in order to maintain a constant temperature irrespective of change in outside temperature. Therefore, a 1° C. or smaller change in the temperature outside the machine does not affect the positioning accuracy of the drive portion and the support portion disposed inside of the machine.

On the other hand, the on-board measuring machine is mounted in the same space as a working attachment (e.g., a spindle) in order to measure the workpiece on the spot basically without a change of a setup after the machining. The space is not the internal space of the ultraprecision working machine but a place where a worker can easily approach for the machining setup.

Therefore, if the temperature around the ultraprecision working machine changes slightly, the temperature of the on-board measuring machine changes as well according to it. Among the members forming the on-board measuring machine, a probe mounted with a linear scale is an extremely small part. Therefore, a minute temperature change of about 0.1° C. causes thermal expansion or thermal contraction of the probe and a temperature drift is superimposed on a displacement detected by a position detecting device such as a linear scale. Moreover, depending on material of a case member of the on-board measuring machine to which a laser head for detecting the displacement of the linear scale is attached, thermal expansion might occur to similarly cause a temperature drift.

In a normal machining center, such a minute temperature drift hardly has an influence. However, at least in the ultraprecision working machine required to have 100-nanometer or less shape accuracy, even a minute thermal fluctuation might cause the temperature drift of the on-board measuring machine to reach several tens of nanometers to several hundreds of nanometers, which results in a fatal error.

Therefore, the temperature drift of the on-board measuring machine needs to be corrected by a different means from that used by the ultraprecision working machine. Especially, this correction is more crucial to the three-dimensional measurement for measuring the whole face of the workpiece than to the prior-art measurement by scanning the measured surface along the two straight lines (cross lines) with the probe.

The technique described in the above-mentioned JP-A No. 2006-138698 includes scanning of the measured surface along two straight lines (cross lines) passing through the center point of the measured surface through which the axisymmetry line passes with the probe (hereafter referred to as "cross-line measurement"). Because the cross-line measurement finishes in a short time, an influence of the temperature drift on the measurement accuracy is ignorable. This is because the temperature drift tends to gradually increase with time in general (see FIG. 2A).

However, the above-described cross-line measurement cannot be carried out in on-board measurement of a workpiece not in the axisymmetric shape to which the technique described in the above Patent Document is not be applied and therefore it is necessary to scan the whole face of the measured surface of the workpiece with the three-dimensional measuring machine. Depending on a measured area and a measurement pitch of the workpiece, there are a large number of measuring paths along which the workpiece is scanned as shown in FIG. 1 and required measurement time might exceed hundreds of times that of the cross-line measurement.

Although the temperature drift within the measurement time along one measuring path is small, the respective measuring paths suffer from different temperature drifts in measuring the whole face of the workpiece. Therefore, the on-board measurement carried out for a long time is more susceptible to the temperature drift. The longer the measurement time, the likelier it becomes that the measurement accuracy is impaired. Therefore, it is necessary to correct the temperature drift in order to achieve the nanoscale shape accuracy.

SUMMARY OF THE INVENTION

Therefore, it is an object of the present invention to provide a method of measuring a shape of a workpiece by using an on-board measuring machine which can solve the above problems and can correct a temperature drift and a machine tool having the on-board measuring machine.

In a method of measuring a shape of a workpiece by using an on-board measuring machine mounted on a machine tool according to the invention, the on-board measuring machine comprises a touch probe having a measuring head and supported on a fluid bearing and a probe position detecting device for detecting a displacement of the touch probe and outputting measuring position data. Probe position data output from the probe position detecting device and axis position data output from an axis position detecting device for detecting positions of respective axes of the machine tool are input to a numerical controller. The method of measuring the shape of the workpiece includes the steps of: presetting a reference point for temperature drift correction on the workpiece or a dummy workpiece for temperature drift correction; carrying out shape measurement on each of a plurality of straight or curved measuring paths by scanning along the measuring paths with the measuring head of the touch probe in contact with the workpiece or the dummy workpiece for temperature drift correction, separate from the workpiece, and; moving the measuring head of the probe to the reference point to bring the measuring head of the probe in contact with the reference point prior to shape measurement on the one measuring path during the shape measurement on each of the measuring paths; and correcting a temperature drift of the on-board measuring machine by setting a reference value of coordinates of the touch probe by setting the probe position data output from the probe position detecting device at a predetermined value by using a workpiece coordinate system setting function possessed by the numerical controller when the measuring head is brought in contact with the reference point.

In a machine tool having an on-board measuring machine according to the invention, the on-board measuring machine has a touch probe supported on a fluid bearing and a probe position detecting device for detecting a displacement of the touch probe and outputting measuring position data. The machine tool comprises a numerical controller for receiving probe position data output from the probe position detecting device and axis position data output from an axis position detecting device for detecting positions of respective axes of the machine tool. The numerical controller comprises a workpiece coordinate system setting means for setting a workpiece coordinate system and a means for causing the on-board measuring machine to carry out shape measurement of a workpiece to be machined by the machine tool according to a measuring program for commanding the shape measurement of the workpiece by bringing a measuring head of the touch probe in contact with the workpiece to scan on a plurality of straight or curved measuring paths. Temperature drift correction is carried out, in the shape measurement on each of the measuring paths by the on-board measuring machine, by moving the measuring head of the probe to a reference point, bringing the measuring head of the probe in contact with the reference point, and resetting a reference value of a coordinate system of the touch probe with the workpiece coordinate system setting means prior to shape measurement on the one measuring path.

The axis position data may be input to the numerical controller via interfaces provided to motor drive units of the respective axes of the machine tool and the measuring position data may be input to the numerical controller via an interface provided to the motor drive unit to which a motor is not connected.

With the above structure, the invention can provide the method of measuring the shape of the workpiece by using the on-board measuring machine which can correct the temperature drift and the machine tool having the on-board measuring machine for carrying out the temperature drift correction.

BRIEF DESCRIPTION OF THE DRAWINGS

Above and other objects and features of the present invention will become apparent from the following description of embodiments with reference to the accompanying drawings, wherein.

DETAILED DESCRIPTION OF THE PREFERRED EMBODIMENTS

Figure 3:
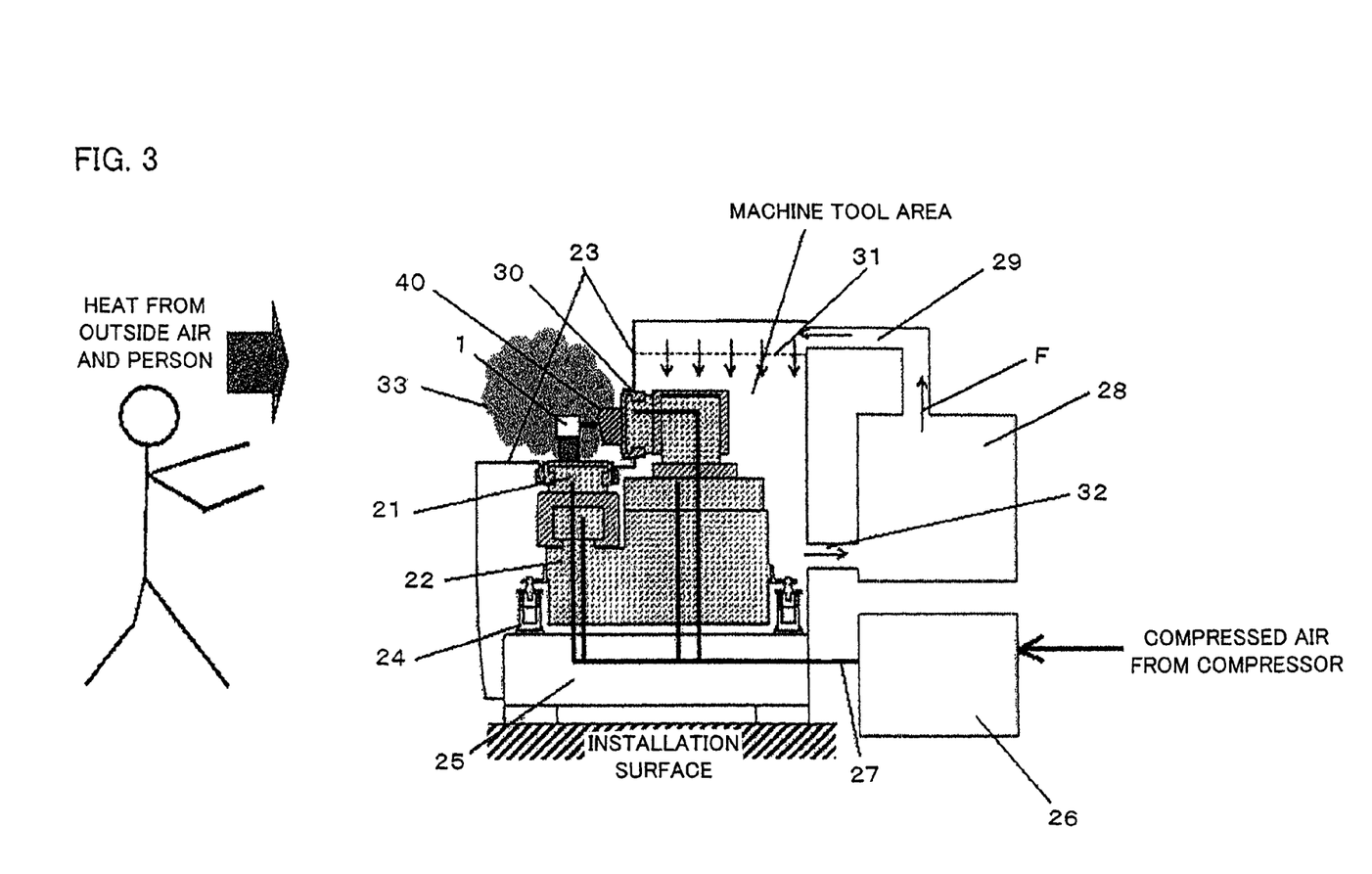
FIG. 3 is a drawing for explaining that an on-board measuring machine mounted on a machine tool is susceptible to heat from outside air and a person.

FIG. 3 is a drawing for explaining that an on-board measuring machine mounted on a machine tool is susceptible to heat from outside air and a person. By using FIG. 3, on-board measurement of the workpiece with the on-board measuring machine will be described.

A drive portion 21 and a support portion 22 of the five-axis machine tool are housed in a cover 23. The drive portion 21 and the support portion 22 are supported on a machine base 25 with vibration-isolating air springs 24 interposed therebetween. The cover 23 houses the drive portion 21, the support portion 22, the machine base 25, and the air springs 24 inside itself to prevent an outside ambient temperature from affecting the components. Compressed air is supplied to the drive portion 21 via a compressed air flow path 27 from a compressed air temperature regulator 26 for an air bearing and disposed outside the cover 23. To the compressed air temperature regulator 26 for the air bearing, compressed air from a compressor (not shown) is supplied. A certain proportion of the compressed air for the air bearing supplied to the air bearing is released outside the cover 23 via a labyrinth 30.

The cover 23 covering the inside of the machine and excluding its labyrinth structure has a hermetically-sealed structure for preventing air from leaking out from the inside of the machine tool. Therefore, exhaust air of the compressed air supplied to the air bearing fills the inside of the machine to create a pressure difference from a machining area 33 and, as a result, the exhaust air from the air bearing flows from the inside of the machine only into the machining area 33 through the labyrinth 30. In this way, dust, outside air, and the like are prevented from entering an inside of the cover 23 from outside through the labyrinth 30.

Into a space in the cover 23, air (arrow F) of regulated temperature is supplied from a machine internal temperature regulator 28 disposed outside the cover 23 via a supply duct 29. In order to regulate the temperature of the space in the cover 23 as uniformly as possible, a diffuser plate 31 is used. The air of the regulated temperature supplied via the supply duct 29 from the machine internal temperature regulator 28 is diffused by the diffuser plate 31 so as not to blows only in a specific direction. The machine internal temperature regulator 28 communicates with the inside of the cover 23 through a recovery duct 32 so that the air in the cover 23 flows back to the machine internal temperature regulator 28. With this structure, temperature in the cover 23 is controlled precisely and the space in the cover 23 is not affected by the change in the ambient temperature outside the cover 23.

An on-board measuring machine 1 is mounted on that face of a table attached to the drive portion 21 which faces the open machining area 33. A machined/measured object (workpiece) 40 is attached to that face of a table mounted on a different drive portion from the drive portion 21 which faces the open machining area 33. Unlike the space area in the cover 23 where the temperature is regulated precisely, temperature of the open machining area 33 changes a lot under the influences of the outside air and heat generated by approach of a worker as compared with the space in the cover 23. In this case, small parts such as a probe of the on-board measuring machine 1 is affected by a minute change in the temperature caused by the outside air or approach of the worker, which affects a displacement output of the probe.

Even if the machining area 33 is covered with a cover (machining area cover), the machining area cover is opened and closed sometimes to change the workpiece and the air of the regulated temperature from the machine internal temperature regulator 28 is not supplied into the machining area cover unlike the inside of the cover 23. Therefore, it is difficult to avoid the influence of the minute change in the temperature caused by the outside air or approach of the worker.

Here, with the structure of the ultraprecision working machine in FIG. 3, the respective drive axes of the machine tool are disposed in the cover 23 and therefore the influence of the minute change in the temperature caused by the outside air or approach of the worker is extremely small. On the other hand, the on-board measuring machine 1 is affected by the minute change in the temperature. Because the on-board measuring machine 1 is basically a component independent of the machine tool, it does not affect positioning accuracy of the drive axes of the machine tool.

Figure 4:
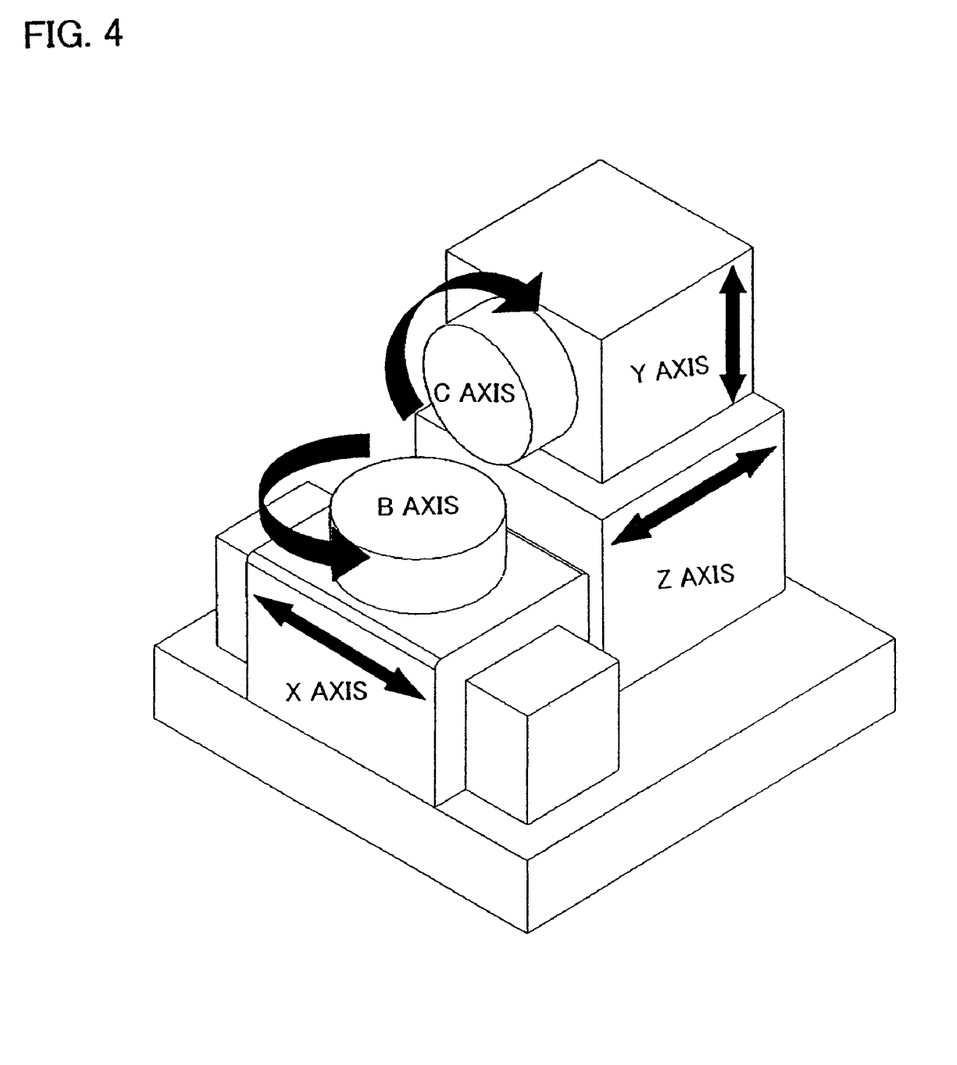
FIG. 4 shows an essential portion of the machine tool having three linear drive axes (an X axis, a Y axis, and a Z axis) and two rotation axes (a B axis and a C axis), the five axes being controlled simultaneously.

FIG. 4 is a drawing for explaining movable portions of five axes of the machine tool on which the on-board measuring machine 1 is mounted. This drawing shows an essential portion of the machine tool controlled by a numerical controller and having three linear drive axes (an X axis, a Y axis, and a Z axis) and two rotation axes (a B axis and a C axis) and the five axes of the machine tool can be controlled simultaneously. The B axis that is the rotation axis is provided on the X axis that is the linear drive axis and the C axis that is the rotation axis is provided on the Y axis that is the linear axis. In the machine tool for carrying out ultraprecision machining, members forming the respective axes shown in FIG. 4 are housed in the cover so as not to be affected by the change in the ambient temperature.

By utilizing this feature of the ultraprecision working machine, the invention provides a method of correcting a temperature drift of the on-board measuring machine and measuring a shape of the workpiece with the on-board measuring machine and the machine tool having the on-board measuring machine for carrying out the temperature drift correction.

Figure 5:
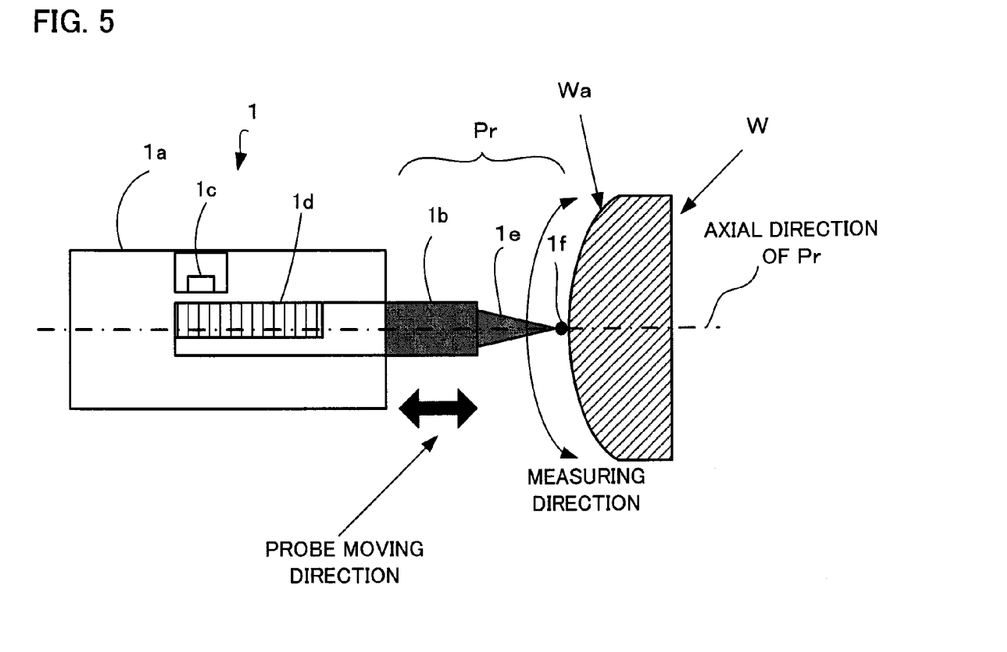
FIG. 5 shows a section of an essential portion of the on-board measuring machine used in an embodiment of the invention.

FIG. 5 shows a section of an essential portion of the on-board measuring machine 1 used in an embodiment of the invention. The on-board measuring machine 1 has a probe main body 1b mounted in a case 1a and the probe main body 1b is movable in an axial direction of a probe by a bearing (not shown) such as an air bearing. A linear scale 1d is attached to the probe main body 1b. A laser head 1c irradiates the linear scale 1d with a laser light and a light receiving element (not shown) receives a reflected light or a transmitted light from the linear scale 1d to detect an axial displacement of the probe main body 1b.

A stylus 1e is attached to one end of the probe main body 1b. The stylus 1e is a thin stick-shaped member. One end of the stylus 1e is fixed to the probe main body 1b and a spherical measuring head 1f is attached to the other end of the stylus 1e. For convenience of explanation, hereafter, the probe main body 1b, the stylus 1e, the spherical measuring head 1f are collectively referred to as the probe Pr.

The spherical measuring head 1f of the probe Pr carries out shape measurement by following a machined surface Wa of the workpiece W in a predetermined direction while pressing and touching the machined surface Wa with predetermined contact pressure T. The contact pressure T can be adjusted to an appropriate value by using a biasing means (not shown), e.g., a magnet, an elastic body such as a spring, and fluid pressure mounted in the on-board measuring machine 1. The probe Pr can be displaced in "PROBE MOVING DIRECTION" shown by an arrow in FIG. 5. A movable range of the probe Pr is restricted by a restricting means (not shown) in the on-board measuring machine 1. Therefore, even if the spherical measuring head 1f of the probe Pr moves away from the machined surface Wa of the workpiece W, the probe main body 1b of the probe Pr does not come out of the on-board measuring machine 1.

To carry out the shape measurement of the workpiece W, the on-board measuring machine 1 is relatively moved with respect to the workpiece W along a measuring path with the spherical measuring head 1f of the probe Pr kept in contact with the workpiece W so that the probe Pr of the on-board measuring machine 1 is positioned around a center of a measurable stroke, for example. Then, by measuring an amount of axial movement of the probe Pr during relative movement of the on-board measuring machine 1 with respect to the workpiece W, it is possible to obtain the shape of the workpiece W.

Figure 2B:
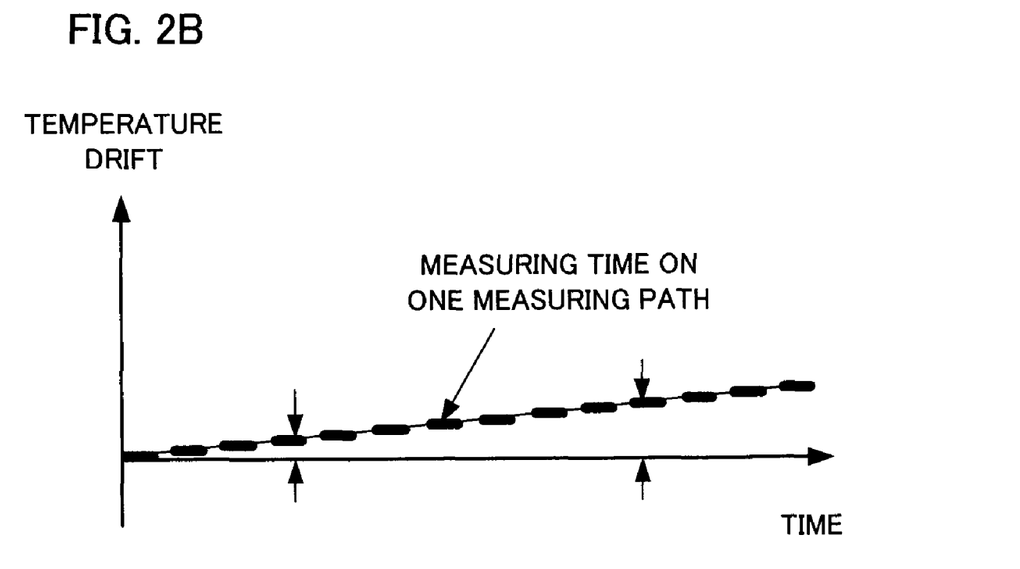
FIG. 2B is a drawing for explaining that, because a measurement time along each measuring path is short in successively scanning a plurality of measuring paths, a temperature drift amount within the measurement time is small.

The respective measuring paths suffer from different temperature drifts in measuring the whole face of the workpiece. Therefore, long-time measurement such as the on-board measurement is susceptible to the temperature drift. The longer the measurement time, the likelier it becomes that the measurement accuracy is impaired (see FIG. 2A). However, a measurement time along one measuring path is short and therefore the temperature drift amount within the measurement time is so small that it is ignorable (see FIG. 2B).

Therefore, in the invention, by utilizing a relationship between the measurement time and the temperature drift along one measuring path, temperature drift correction is carried out every time the shape measurement on one (the i-th) measuring path is finished and before starting the shape measurement on the next (the i+1-th) measuring path. In this way, the influence of the temperature drift caused by measurement on many measuring paths over a long time is avoided.

Next, by using FIGS. 6 and 7, the correction of the temperature drift in the on-board measurement will be described more specifically.

Figure 6:
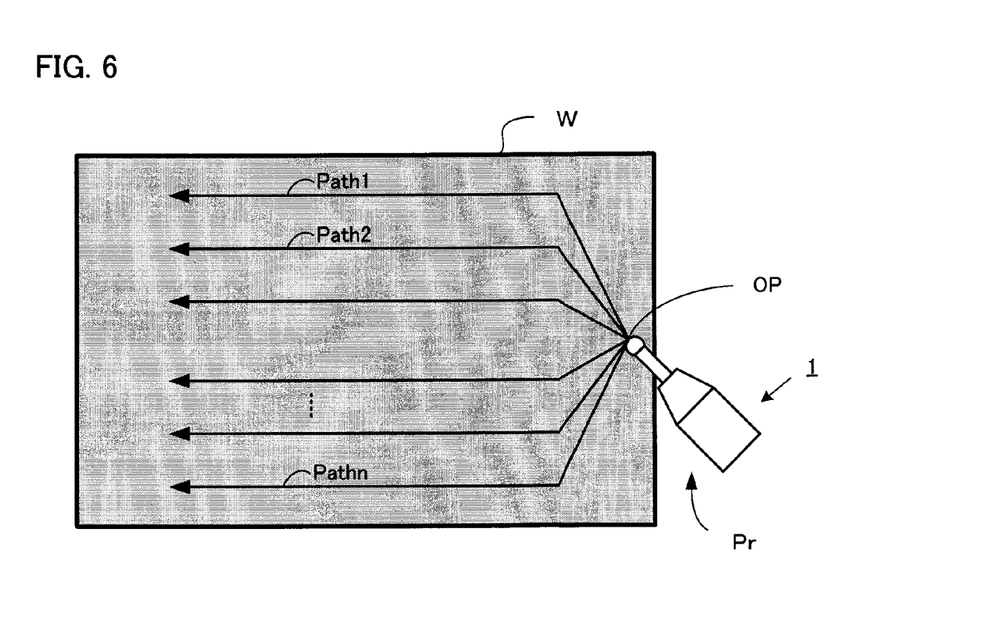
FIG. 6 is a drawing for explaining shape measurement of a workpiece along respective measuring paths starting from a reference point set on a measured surface of the workpiece by a method of measuring a shape of the workpiece according to the invention.

FIG. 6 shows the shape measurement of the workpiece W along the respective measuring paths starting from a reference point OP set on a measured surface of the workpiece W. As shown in FIG. 6, before carrying out the shape measurement of the workpiece W by using the on-board measuring machine 1, an arbitrary point on the workpiece W is set as the point (reference point) OP which is a baseline for the temperature drift correction. The reference point OP can be set in any position on the workpiece W by using a workpiece coordinate system set in advance. The workpiece W has a larger heat capacity than the probe Pr and is less likely to thermally expand or thermally contract in response to the change in the outside ambient temperature.

As described above, the measurement time along any one of the n measuring paths (Path 1, Path 2, . . . Path n) is relatively short and therefore the influence of the temperature drift within the measurement time on the measuring path is ignorable (see FIG. 2B). Therefore, before carrying out the shape measurement of the workpiece W along the first measuring path Path 1, the spherical measuring head 1*f* of the probe Pr is brought in contact with the reference point OP on the workpiece W.

Then, by resetting measuring position data output from the on-board measuring machine 1 when the spherical measuring head 1*f* comes in "contact" with the workpiece W, the temperature drift on the first measuring path Path 1 is corrected ("the first temperature drift correction"). Here, the data may be reset to zero or a predetermined value. In this way, a reference value of the coordinate system of the touch probe Pr is set before scanning along the first measuring path Path 1. Here, the "contact" means to bring the spherical measuring head 1*f* of the probe Pr in contact with the workpiece so that the probe Pr of the on-board measuring machine 1 is positioned around the center of the measurable stroke in carrying out the shape measurement of the workpiece W.

When the probe Pr reaches an end point of the first measuring path Path 1, it moves again to the position of the reference point Op before moving on to the second measuring path Path 2. Then, as described above, the spherical measuring head 1*f* of the probe Pr is brought in contact with the reference point OP of the workpiece and position information output from the on-board measuring machine 1 when the spherical measuring head 1*f* comes in contact with the workpiece W is reset. The position information is reset to the same value (e.g., zero) as that in the first temperature drift correction.

Similarly, after the end of the shape measurement on the third measuring path Path 3, . . . the i-th measuring path Path i, . . . and the n−1-th measuring path Path n−1, the probe Pr is moved to the reference point OP and temperature drift correction for the n-th (last) measuring path Path n is carried out.

As a result, the on-board measurement according to the invention in which the temperature drift correction is carried out before scanning of each measuring path requires longer time than the prior art which does not carry out such temperature drift correction, but the temperature drift is corrected properly.

Figure 7:
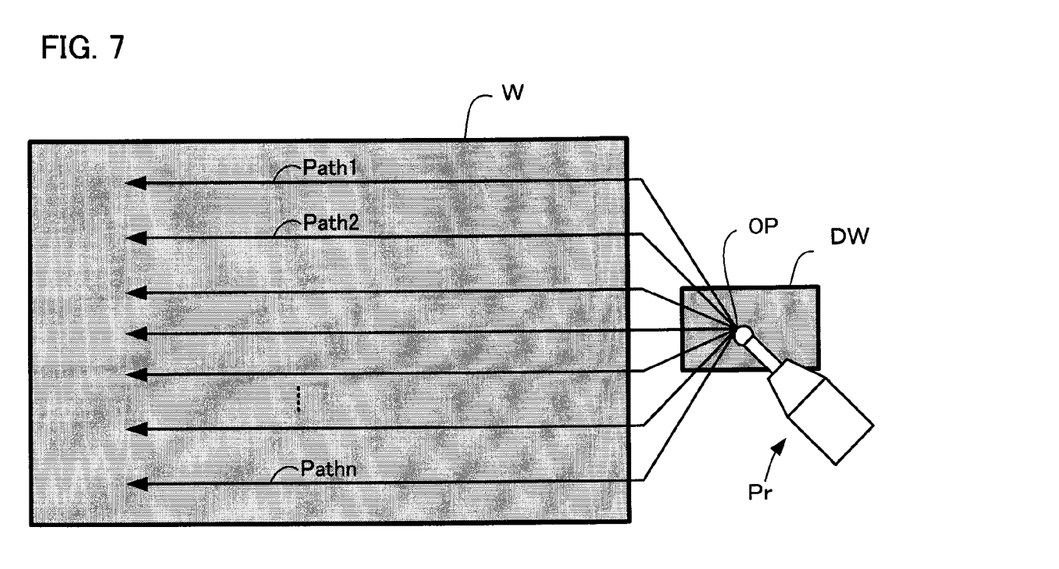
FIG. 7 is a drawing for explaining shape measurement of the workpiece along respective measuring paths starting from a reference point set on a dummy workpiece separate from the workpiece by the method of measuring the shape of the workpiece according to the invention.

FIG. 7 shows an example in which a dummy workpiece DW for drift correction and separate from the workpiece W to be measured is used for the temperature drift correction. As the dummy workpiece DW, a member made of material such as glass and ceramic having a low thermal expansion coefficient is used. By using the dummy workpiece DW made of material having the low thermal expansion coefficient, it is possible to ignore an influence of expansion or contraction of the dummy workpiece DW due to the change in the outside ambient temperature.

An arbitrary point on the dummy workpiece DW is set in advance as a reference point OP which is a baseline for the temperature drift correction. Then, similarly to the manner shown in FIG. 6, the temperature drift correction in carrying out the shape measurement is started by moving the probe Pr to the preset reference point OP at the beginning of the shape measurement on each measuring path (Path 1, Path 2, . . . Path n).

Figure 8:
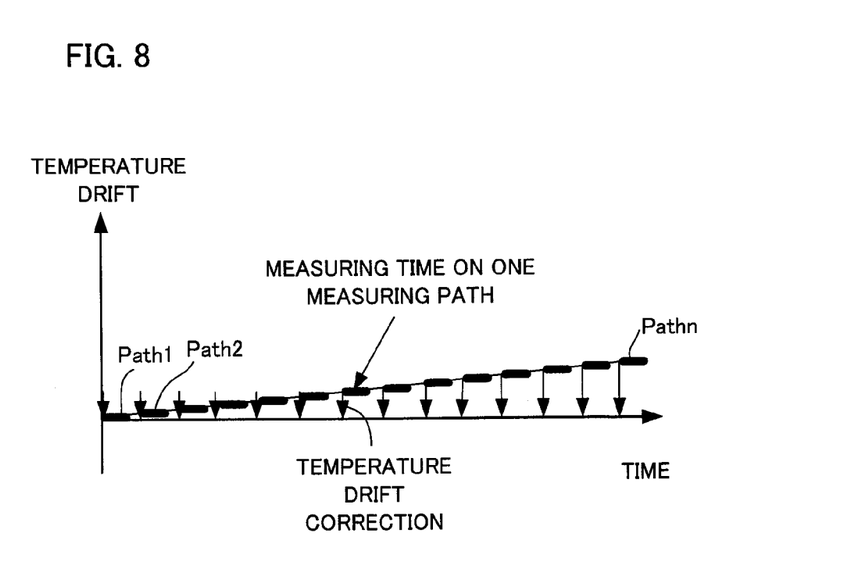
FIG. 8 is a drawing for explaining that it is possible to achieve stable measurement over a long time, because a temperature drift amount is suppressed to a temperature drift amount corresponding to one measuring path by repeatedly resetting measuring position data at the reference point for scanning on every measuring path, even if measurement is carried out for a long time along a plurality of measuring paths.

FIG. 8 explains that, even in the case of carrying out the shape measurement of the whole face of the workpiece W, it is possible to ignore the influence of the temperature drift by moving the measuring head of the probe of the on-board measuring machine to the preset reference point prior to scanning by the probe on each of the plurality of measuring paths and bringing the measuring head of the probe in contact with the reference point to thereby carry out the temperature drift correction of the on-board measuring machine as shown in FIGS. 6 and 7.

As in the invention, even if measurement is carried out along the plurality of (n) measuring paths over a long time, it is possible to suppress the temperature drift amount to the temperature drift amount for one measuring path by repeating reset of the measuring position data for every measuring path to thereby achieve stable long-time measurement.

Figure 9:
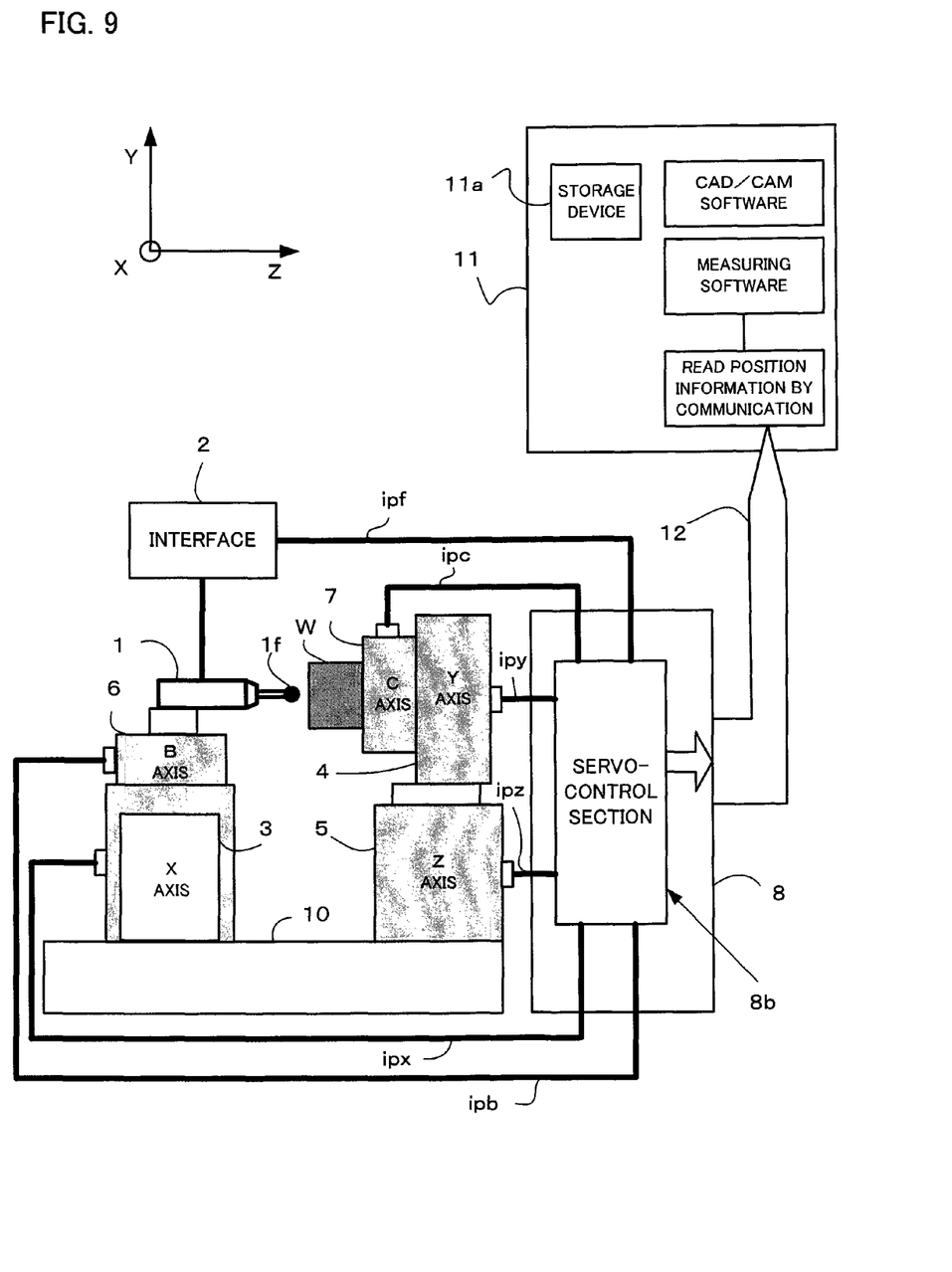
FIG. 9 is a schematic block diagram of an embodiment of a machine tool in which a position detection signal from the on-board measuring machine and position detection signals from respective drive axes of the machine tool are input to a numerical controller.

FIG. 9 is a schematic block diagram of the embodiment of the machine tool in which a position detection signal from the on-board measuring machine and position detection signals from the respective drive axes of the machine tool are input to the numerical controller. In the machine tool, a position detection signal ipf that is a measurement signal related to a displacement of the probe Pr is input to a servo-control section 8*b* of the numerical controller 8 from the on-board measuring machine 1, which is mounted on the B axis to measure a surface shape of the workpiece W, via an interface 2 (see FIG. 11B). The position detection signals output from position detecting devices provided to the respective movable axes of the machine tool are synchronously input to the servo-control section 8*b* as well via interfaces (not shown). The interfaces are formed so that the position detection signals output from the position detecting devices 96*x*, 96*y*, . . . (see FIG. 10) mounted in servomotors 95*x*, 95*y*, . . . and the measurement signal output from the on-board measuring machine 1 are synchronously input to the servo-control section 8*b* of the numerical controller 8.

In the embodiment of the invention, high-precision detecting devices such as linear scales and laser interferometers are used preferably as the position detecting device for detecting the displacement of the probe main body 1*b* of the on-board measuring machine 1 and the position detecting devices for detecting positions of the linear drive axes of the machine tool. Encoders are used preferably as the position detecting devices for detecting positions of the rotation axes of the machine tool.

The numerical controller 8 includes a storage means for storing pieces of position information of the respective movable axes of the machine tool and measurement information (position information) from the on-board measuring machine 1 and an interface for sending the position information stored in the storage means to a personal computer 11 as an external storage device. An axial moving speed of the probe Pr can be calculated from the pieces of position information stored in the numerical controller 8. For example, the speed can be obtained from a difference between the pieces of position information for respective control periods.

Because the position detection signals that are feedback signals from the respective axes of the machine tool and the position detection signal from the on-board measuring machine 1 are respectively obtained by the servo-control section 8*b* of the numerical controller 8 via the interfaces (see FIG. 11B) having the same circuit configurations, the measurement signals from the position detecting devices of the respective axes and the on-board measuring machine (i.e., the axis position detection signals of the respective axes and the position detection signal of the on-board measuring machine) are synchronously input to the numerical controller 8. Then, the read axis position detection signals and position detection signal are stored as pieces of position information in the storage means (not shown), which is a register of the numerical controller 8, for every control period of the numerical controller.

The numerical controller 8 communicates on a LAN with the personal computer 11 as the external device via Ethernet (registered trademark) 12 and sends the pieces of position information from the respective axes and the measurement signal from the on-board measuring machine 1 to a storage device 11a connected to or mounted in the personal computer 11. The personal computer 11 synchronously stores the pieces of position information from the respective axes and the position information from the on-board measuring machine 1 in the storage device 11a for each sampling period.

The measurement software is stored in the personal computer 11 to perform necessary arithmetic processing such as shape measurement of the workpiece based on the pieces of position information read in via the numerical controller 8. The necessary arithmetic processing such as the shape measurement is similar to that in the prior art. In this personal computer 11, a measurement NC program, a machining NC program, and a machining corrective NC program are stored.

Figure 10:
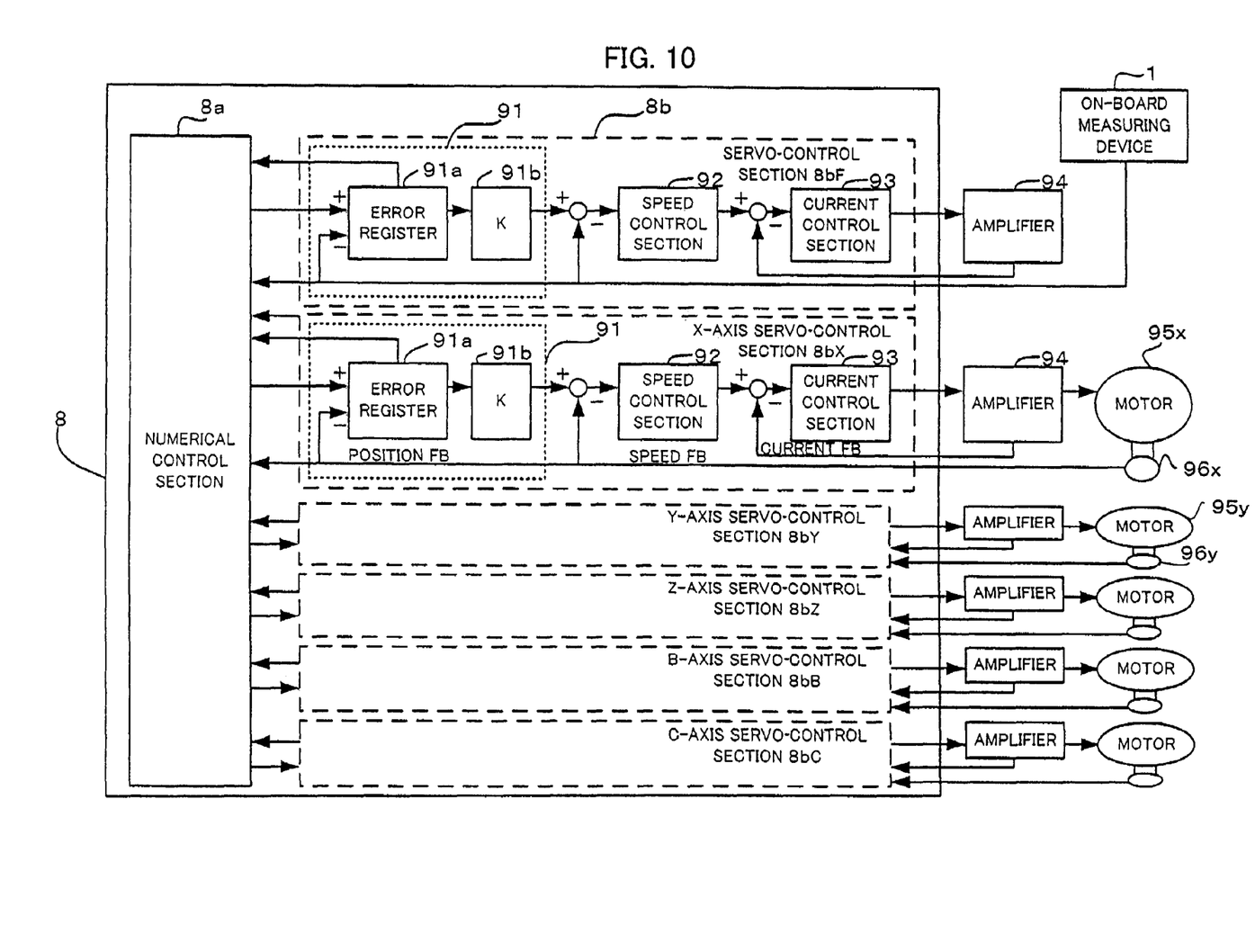
FIG. 10 is a drawing for explaining that the signals from the respective axes of the machine tool and the signal from the on-board measuring machine shown in FIG. 9 are input to the numerical controller.

FIG. 10 is a drawing for explaining that the signals from the respective axes of the machine tool and the signal from the on-board measuring machine shown in FIG. 9 are input to the numerical controller.

FIG. 10 is a drawing showing that respective axes (the X axis, the Y axis, the Z axis, the B axis, and the C axis) of the machine tool shown in FIG. 9 are feedback-controlled in terms of position, speed, and current by servo-control sections 8bX, 8bY, 8bZ, 8bB, and 8bC of the numerical controller 8. The feedback control is control that is normally carried out by a numerical controller for controlling a machine tool. Here, the X-axis servo-control section 8bX will be described as an example.

The X-axis servo-control section 8bX is formed of a position control section 91 for carrying out position loop control, a speed control section 92 for carrying out speed loop control, and a current control section 93 for carrying out current loop control.

The position control section 91 has an error register 91a and an amplifier 91b for a position loop gain K. The position control section 91 (error register 91a) receives a movement command from the numerical control section 8a and subtracts a position feedback amount (position FB) from the received movement command to obtain a position deviation amount. The position control section 91 multiplies the position deviation amount by a position loop gain K to obtain a speed command and passes the obtained speed command to the speed control section 92. The position deviation amount calculated in the error register 91a is output to the numerical control section 8a as well.

The speed control section 92 carries out the speed loop control based on a speed deviation amount obtained by subtracting a speed feedback amount (speed FB) from the received speed command to obtain a current command and passes the obtained current command to the current control section 93.

From the received current command, the current control section 93 subtracts a current feedback (current FB) from a current sensor (not shown), which is mounted in an amplifier 94 for driving the servomotor 95 and which detects an current passing through the servomotor 95, to obtain a current deviation amount and carries out the current loop control based on the obtained current deviation amount.

The servomotor 95 is a driving means for driving the X axis and mounted with a position/speed detector 96 for detecting a position and speed of the X axis. The position feedback amount (position FB) from the position/speed detector 96 is fed back to the position control section 91 and the speed feedback amount (speed FB) is fed back to the speed control section 92.

Since servo-control sections, 8bY, 8bZ, 8bB, and 8bC of the Y axis, the Z axis, the B axis, and the C axis shown in FIG. 10 have the same structures and functions as the above-described X-axis servo-control section 8bX, they will not be described. In FIGS. 9 and 10, the X axis, the Y axis, and the Z axis are the linear drive axes and the B axis and the C axis are the rotation axes.

The numerical controller shown in FIG. 10 is provided, besides the servo-control sections 8bX, 8bY, 8bZ, 8bB, and 8bC of the X axis, the Y axis, the Z axis, the B axis, and the C axis, with the servo-control section 8bF to which the motors for driving the respective axes of the machine tool and their position/speed detecting means are not connected. The letter "F" of the reference numeral 8bF designating the servo-control section stands for "free", which means that the section is free of control of any one of the movable axes of the machine tool.

The numerical controller 8 recognizes addition of the servo-control section 8bF to the servo-control sections 8bX, 8bY, 8bZ, 8bB, and 8bC merely as addition of another control axis. The additional servo-control section 8bF is provided with an amplifier 94 similarly to the servo-control sections 8bX, 8bY, 8bZ, 8bB, and 8bC for controlling the respective axes of the machine tool. Because no servomotor is connected to the servo-control section 8bF, the numerical controller 8 brings the servo-control section 8bF into a servo-off state. Moreover, a parameter and control software are changed so that the position detection signals are counted normally by using a follow-up function.

Instead of the servomotor, the on-board measuring device 1 is connected to the servo-control section 8bF. In the example shown in FIG. 10, the measurement signal ipf from the on-board measuring device 1, instead of the position detection signal from the position/speed detector 96 mounted in the servomotor 95, is input to the servo-control section 8bF via an interface (not shown) which is provided to the amplifier 94 connected to the servo-control section 8bF. The interface is provided to the amplifier 94 as described above and is not different from prior art.

Figure 11A:
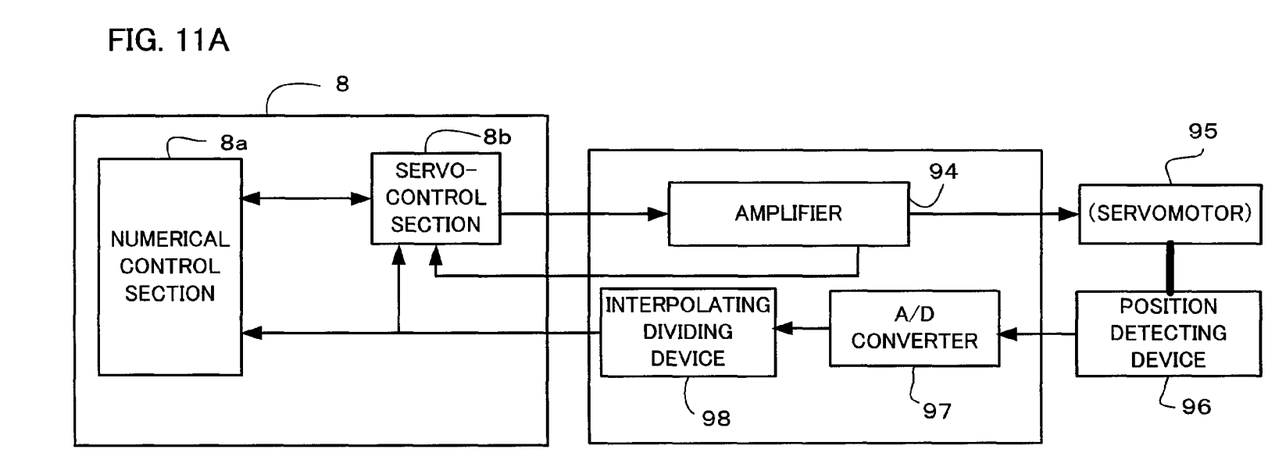
FIG. 11A is a block diagram for explaining that feedback signals (position detection signals) from the respective axes of the machine tool are retrieved by servo-control sections of the numerical controller via interfaces.
Figure 11B:
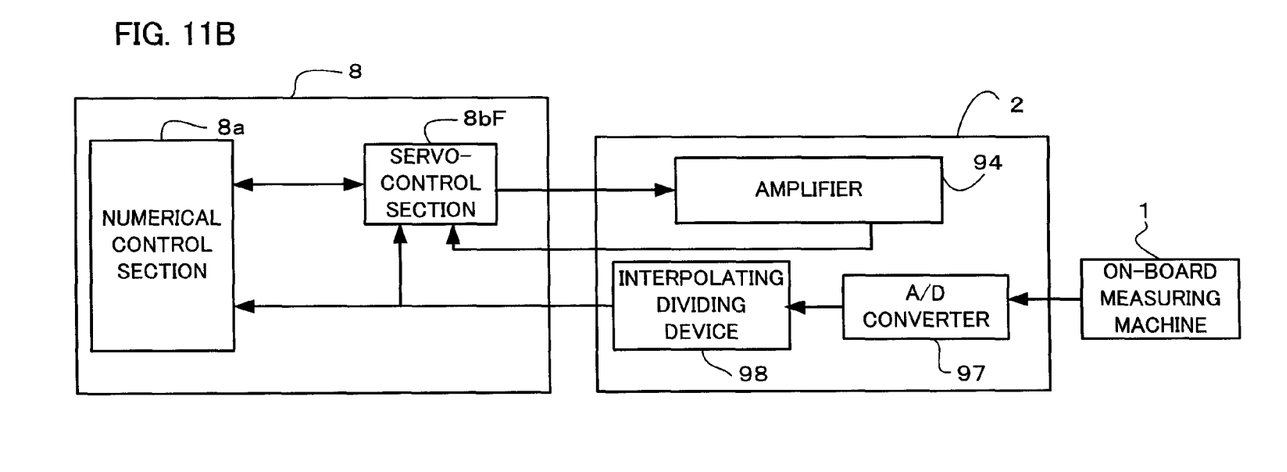
FIG. 11B is a block diagram for explaining that the position detection signal from the on-board measuring machine is retrieved by the servo control section of the numerical controller via an interface having the same circuit configuration as that in FIG. 11A.

FIGS. 11A and 11B are block diagrams showing examples of the interfaces used in the embodiment of the invention. As shown in FIG. 11A, an amplifier unit is provided with the amplifier 94 that is the motor driving means, an A/D converter 97, and an interpolating dividing device 98. Signals (sine-wave and cosine-wave analog signals) output from the position detecting device 96 mounted in the servomotor 95 are input to the A/D converter 97.

The A/D converter 97 converts the analog signals output from the position detecting device 96 into digital signals and outputs the digital signals resulted from the conversion to the interpolating dividing device 98. The interpolating dividing device 98 performs processing for dividing the digital signal corresponding to the analog signal for one period (a period of sine wave) from the position detecting device 96. As the processing performed when better resolution than resolution for a normal analog signal is required, the device 98 finely divides the analog signal for one period (periods resulted from the division represent the resolution).

FIG. 11B is the block diagram showing the example of the interface 2 shown in FIG. 9 and the interface 2 has the same configuration as the above-described interface (amplifier unit) shown in FIG. 11A.

By using the interface for controlling driving of the servomotor as the interface in the on-board measuring machine 1, it is possible to easily take the position detection signals output from the position detecting devices 96x, 96y, ... and the measurement signal from the on-board measuring machine 1 into the servo-control section 8b of the numerical controller 8. Moreover, a special interface does not need to be prepared for the on-board measuring machine 1 and it is possible to avoid an increase in cost. The position detection signal from the on-board measuring machine 1 is input to the numerical controller 8 not necessarily via the interface shown in FIG. 11A or 11B.

Figure 12:
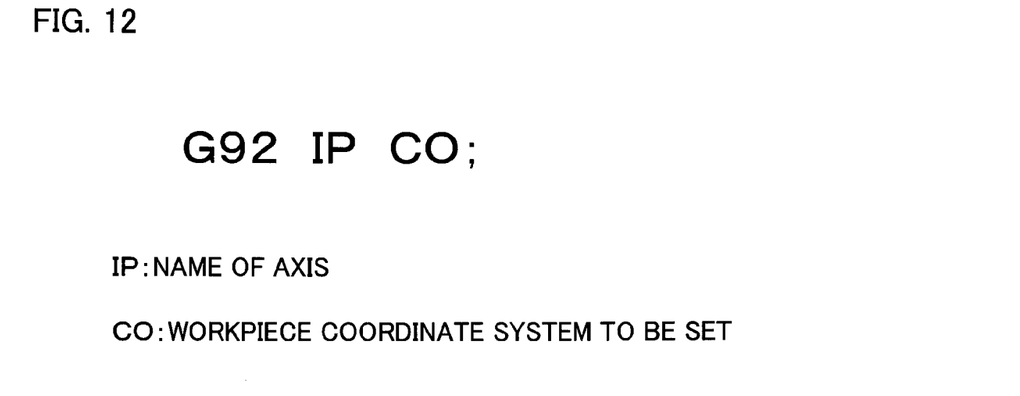
FIG. 12 is a drawing for explaining a G code and a format for setting a workpiece coordinate system originally possessed by the machine tool.

FIG. 12 is a drawing for explaining a G code and a format originally possessed by the machine tool to set a workpiece coordinate system. In the invention, the probe Pr of the on-board measuring machine 1 is moved to the preset reference point Op and then the measuring position data from the on-board measuring machine is reset in order to set the coordinate system of the probe Pr. In the invention, the reset is carried out by using a function of setting the workpiece coordinate system originally possessed by the machine tool. By carrying out the reset in this manner, new software need not be prepared for the temperature drift correction and the configuration of the numerical controller does not need to be changed.

In FIG. 12, "G92" is a G code for commanding the numerical controller to set the coordinate system, "IP" is a name of the axis for which the coordinate system is set by "G92", and "CO" is a coordinate value set for the axis name "IP". This setting of the program reference point (workpiece reference point) by using the code "G92" is normally used in an NC machining program. In the embodiment, the numerical controller recognizes the on-board measuring machine 1 as one of the axes of the machine tool and therefore it is possible to set the coordinate similarly to the drive axes of the machine tool by using the code "G92" for commanding setting of the coordinate system.

Figure 13:
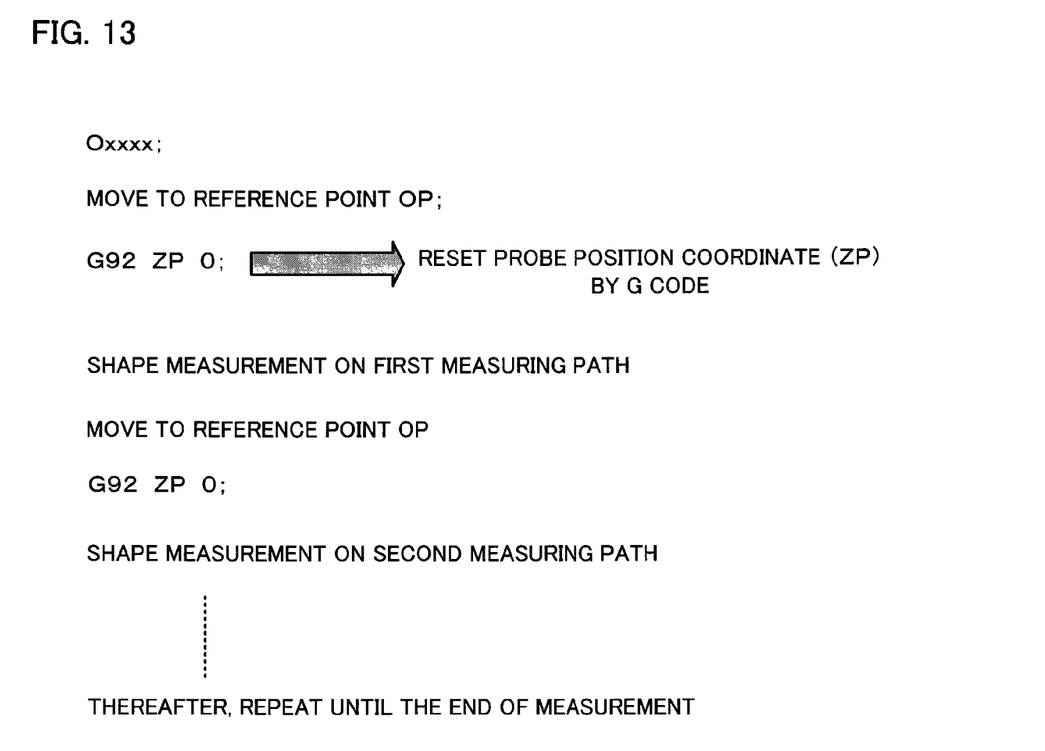
FIG. 13 is a drawing for briefly explaining an example of a measuring program for commanding shape measurement of the workpiece according to the invention.

FIG. 13 is a drawing for briefly explaining an example of a measuring program in the embodiment of the invention. The descriptions given by using FIGS. 6 and 7 can be configured as the measuring program shown in FIG. 13.

According to the measuring program, the probe Pr is moved to the reference point OP and the coordinate system is set by using the code "G92" at the reference point OP (here, reset to zero). Then, the shape measurement of the workpiece W is carried out on each measuring path and the operation and processing similar to those described above are carried out until shape measurement on the every measuring path is finished.

Figure 14:
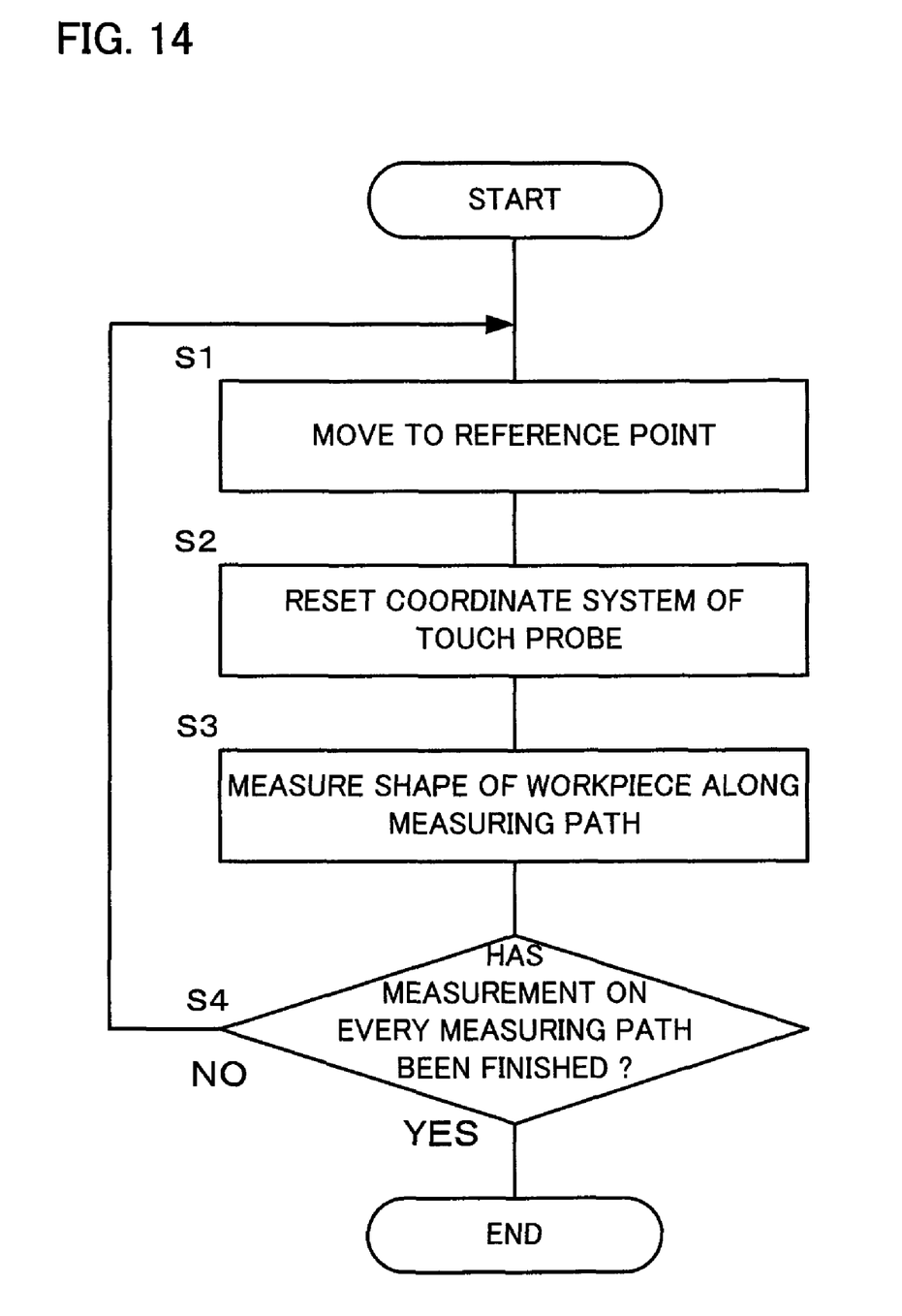
FIG. 14 is a flowchart showing an algorithm of processing for carrying out temperature drift correction and the shape measurement of the workpiece performed by the numerical controller.

FIG. 14 is a flowchart showing an algorithm of processing for carrying out the temperature drift correction and the shape measurement of the workpiece performed by the numerical controller 8.

First, the probe Pr of the on-board measuring machine 1 is moved to the reference point (step S1) and the coordinate system of the probe Pr is set (step S2). Then, the shape measurement of the workpiece is carried out along a specific measuring path (Path i) (step S3). Whether or not measurement on every measuring path has been finished (i.e., whether or not measurement on the last measuring path (Path n) has been finished) is determined (Step S4). If the measurement on every measuring path has not finished yet, the processing returns to step S1 where measurement of the remaining measuring paths is continued. If the measurement on every measuring path has been finished, on the other hand, the shape measuring processing is ended.

If a processor (not shown) of the numerical controller 8 performs the processing shown in FIG. 14 in the above manner, it is possible to carry out measurement along every measuring path.

What is claimed is:

1. A method of measuring a shape of a workpiece by using an on-board measuring machine mounted on a machine tool, the on-board measuring machine comprising a touch probe having a measuring head and supported on a fluid bearing and a probe position detecting device for detecting a displacement of the touch probe and outputting measuring position data, and probe position data output from the probe position detecting device being input to a numerical controller together with axis position data output from an axis position detecting device for detecting positions of respective axes of the machine tool, the method of measuring the shape of the workpiece comprising the steps of:
presetting a reference point for temperature drift correction on the workpiece or a dummy workpiece separate from the workpiece;
carrying out shape measurement on each of a plurality of straight or curved measuring paths by scanning along the measuring paths with the measuring head of the touch probe in contact with the workpiece;
moving the measuring head of the probe to the reference point to bring the measuring head of the probe in contact with the reference point prior to shape measurement on the one measuring path during the shape measurement on each of the measuring paths; and
correcting a temperature drift of the on-board measuring machine by setting a reference value of coordinates of the touch probe by setting the probe position data output from the probe position detecting device at a predetermined value by using a workpiece coordinate system setting function possessed by the numerical controller when the measuring head is brought in contact with the reference point.

2. A machine tool having an on-board measuring machine, wherein the on-board measuring machine has a touch probe supported on a fluid bearing and a probe position detecting device for detecting a displacement of the touch probe and outputting measuring position data, the machine tool comprising a numerical controller for receiving probe position data output from the probe position detecting device and axis position data output from an axis position detecting device for detecting positions of respective axes of the machine tool, and
the numerical controller comprises:
a workpiece coordinate system setting means for setting a workpiece coordinate system; and
a means for causing the on-board measuring machine to carry out shape measurement of a workpiece to be machined by the machine tool according to a measuring program for commanding the shape measurement of the workpiece by bringing a measuring head of the touch probe in contact with the workpiece to scan on a plurality of straight or curved measuring paths, wherein
temperature drift correction is carried out, in the shape measurement on each of the measuring paths by the on-board measuring machine, by moving the measuring head of the probe to a reference point, bringing the measuring head of the probe in contact with the reference point, and resetting a reference value of a coordinate system of the touch probe with the workpiece coordinate system setting means prior to shape measurement on the one measuring path.

3. The machine tool having the on-board measuring machine according to claim 2, wherein the axis position data are input to the numerical controller via interfaces provided to motor drive units for the respective axes of the machine tool and the measuring position data is input to the numerical controller via an interface provided to the motor drive unit to which a motor is not connected.

* * * * *